(12) United States Patent
Feyaerts

(10) Patent No.: US 6,771,636 B1
(45) Date of Patent: Aug. 3, 2004

(54) METHOD AND TELECOMMUNICATIONS SYSTEM FOR TRANSMITTING DATA FROM A FIRST TO A SECOND PRIVATE BRANCH EXCHANGE

(75) Inventor: Johan Feyaerts, Arendonk (BE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/323,563

(22) Filed: Jun. 1, 1999

(30) Foreign Application Priority Data

May 29, 1998 (DE) .......................................... 198 24 161

(51) Int. Cl.[7] .............................................. H04L 12/56
(52) U.S. Cl. ...................................... 370/352; 370/474
(58) Field of Search ............................... 370/466, 474, 370/465, 352, 353, 345, 355, 389

(56) References Cited

U.S. PATENT DOCUMENTS

| | | | | |
|---|---|---|---|---|
| 5,422,943 A | * | 6/1995 | Cooney et al. | |
| 5,550,907 A | * | 8/1996 | Carlsen | |
| 5,757,775 A | * | 5/1998 | Yokoyama et al. | |
| 5,790,649 A | * | 8/1998 | Hiroshige | 379/201 |
| 5,949,873 A | * | 9/1999 | Pinard | |
| 6,091,728 A | * | 7/2000 | Lazraq et al. | |
| 6,226,287 B1 | * | 5/2001 | Brady | |
| 6,389,005 B1 | * | 5/2002 | Cruickshank | |

* cited by examiner

Primary Examiner—Kenneth Vanderpuye
(74) Attorney, Agent, or Firm—Laurence A. Greenberg; Werner H. Stemer; Gregory L. Mayback

(57) ABSTRACT

Data are transmitted in a telecommunications system from a first private branch exchange to a second private branch exchange. The data include wanted data, for example voice information, and control data for controlling a private branch exchange. The control data include information about service attributes of the private branch exchanges. The data are interchanged in the form of data packets via a computer network.

19 Claims, 6 Drawing Sheets

METHOD AND TELECOMMUNICATIONS SYSTEM FOR TRANSMITTING DATA FROM A FIRST TO A SECOND PRIVATE BRANCH EXCHANGE

BACKGROUND OF THE INVENTION

Field of the Invention

The invention lies in the telecommunications field. More specifically, the invention relates to a method for transmitting data from a first to a second private branch exchange in a private network. The invention also relates to a telecommunications system.

In order to allow subscribers in a telephone network to be offered specific service attributes, such as display of information about the calling subscriber, control data are also transmitted in addition to the wanted data, for example voice data. The control data include instructions to a switching center. One example of such an instruction to the switching center is call diversion, that is to say all calls going to a specific terminal shall be diverted to another terminal. This method is used in the public telephone network and in private branch exchanges which are used, for example, in businesses.

A protocol defines how connections are set up between the subscribers in a telephone network, which service attributes are offered in the telephone network, and how wanted data and control data must be transmitted. One example of such a protocol is the "QSIG" protocol. Connections between subscribers in different private branch exchanges are in this case routed via the public telephone network. In the process, one problem that arises is that the service attributes which are offered exclusively by the private branch exchanges and not by the public telephone network cannot be used, since the public telephone network does not offer the capability to transmit the required control data.

One known solution for this limitation is the use of a tie line between the private branch exchanges via the public telephone network. However, this solution has the disadvantage that the transmission capacity of the tie line is limited, and cannot be matched to the currently required transmission capacity. For a network with a number of private branch exchanges, which is called a private network, an optimum arrangement of the tie line can be found only with a high level of complexity. Any change to the number of private branch exchanges to be connected also requires adaptation to the arrangement of the tie lines. Furthermore, setting up such a private network is relatively costly.

SUMMARY OF THE INVENTION

It is accordingly an object of the invention to provide a method for interchanging data between private branch exchanges and a telecommunications system, which overcomes the above-mentioned disadvantages of the heretofore-known devices and methods of this general type and which allows using the service attributes of the private branch exchanges with little complexity and at low cost.

With the foregoing and other objects in view there is provided, in accordance with the invention, a method for transmitting data from a first private branch exchange via a computer network to a second private branch exchange, the method which comprises the following method steps:

splitting data to be transmitted from a calling subscriber of a first private branch exchange to a called subscriber of a second private branch exchange into wanted data and control data with a first converter, wherein the wanted data contain wanted information and connection set-up information, and the control data are data for controlling the second private branch exchange;

determining destination address information from the connection set-up information and identifying a receiver device;

converting, with a first switching unit assigned to the first private branch exchange, the wanted data and control data into data packets, and transmitting the data packets via a computer network to the receiver device designated by the destination address information;

receiving the data packets with a second switching unit assigned to the second private branch exchange, converting the data packets into wanted data and control data, and passing the data on to a second converter; and joining the wanted data and the control data together with the second converter and forming data for further processing by the second private branch exchange.

In other words, each private branch exchange has access to a computer network which is used for transmitting data packets. The computer network is used to interchange the wanted data and control data between the private branch exchanges.

In accordance with an added feature of the invention, the connection set-up information is formulated on the basis of a number plan assigned to the first private branch exchange. The number plan contains subscribers of the private branch exchanges and a respective private branch exchange associated with each subscriber. All the subscribers of the private network are listed in the number plan, with the respective private branch exchange associated with them. Once a calling subscriber has dialed a number, the private branch exchange uses the number plan to check whether this number refers to a terminal of its own private branch exchange. If the number belongs to a terminal in another private branch exchange, it passes the wanted data and control data on to a converter. The primary example of wanted data are voice data.

The converter splits the data for the calling subscriber into wanted data and control data, defines destination address information with whose aid the data can be transmitted to a second converter, and passes the data on to a first switching unit. The first switching unit opens a connection to the computer network and uses the wanted data and control data to form data packets, which it transmits via the computer network to a second switching unit. The second switching unit joins the received data packets together again to form a wanted data stream and a control data stream, and passes the streams on to the second converter. The second converter joins the wanted data and control data together and transmits this data to the second private branch exchange connected to it, which can be controlled by the transmitted control data.

The method according to the invention allows any desired number of private branch exchanges to be combined to form a private network. In order to expand the private network, the number plan of the private network is expanded by the numbers of the exchange to be integrated, and this is notified throughout the entire private network.

In accordance with an additional feature of the invention, the computer network is the Internet or an Intranet and the data packets are generated according to the Internet Protocol IP. The Internet Protocol IP defines how the wanted data and control data are split into data packets and are transported, and defines a format for addresses of computers in the computer network. Thus, both the Internet and an Intranet can be used for the invention.

Four embodiments for interchanging data between the private branch exchange and the computer network are described in the following text. In a first embodiment, the private branch exchange contains the converter and the switching unit. The private branch exchange sends the control data to the computer network via a first logic link, and the wanted data via a second logic link. The same physical connection can be used for transmitting the data via the first and second logic links. This embodiment is suitable, in particular, for private branch exchanges where the number of calls to other private branch exchanges which are part of the private network is low.

In a second embodiment, the private branch exchange is connected to a switching computer, which passes the wanted data and control data on to the computer network. In this embodiment, the private branch exchange transmits the wanted data and control data via separate connections to the switching computer. The control data can be transmitted using a method which is defined by the known X.25 protocol. The wanted data can be transmitted using a telephone connection, for example an ISDN connection.

In a third embodiment, the tasks of the converter and of the switching computer are carried out by a common computer. The private branch exchange interchanges the wanted data and control data with the computer via a telephone connection. This computer splits the wanted data and control data and prepares them such that they can be transmitted by the computer network to the second private branch exchange. For example, communication between the private branch exchange and the computer can be carried out using a method which is described by the known QSIG protocol or another protocol for private networks, for example DPNSS or CorNet-N.

In a fourth embodiment, the functions of the converter and the communication with the computer network are respectively carried out by autonomous computers. The communication between the private branch exchange and the converter may be carried out, for example, using the method defined by the QSIG protocol. The control data can be transmitted from the converter to the switching computer using the method defined by the X.25 protocol or another protocol for connection-oriented data transmission, while the wanted data are preferably sent to the switching computer via a telephone connection.

The X.25 protocol describes a method for connection-oriented transmission of data packets. In this case, the data packets from a number of transmitters are transmitted by one multiplexer via one data line. It is feasible for the method for data transmission in accordance with the X.25 protocol to be adapted such that it is possible to dispense with the multiplexer, and to transmit the data asynchronously. One possible embodiment of such an adapted method is the insertion of control symbols for separating the data blocks. These data blocks are formed from the data packets using a method defined by the "High Level Data Link Control" protocol, the HDLC protocol for short. The symbol "Start of Text," STX for short, can be used, for example, for the start of the data block, and the symbol "End of Text," ETX for short, for the end of the data block.

Furthermore, it is worthwhile for the converter to report the IP address of the second switching computer to the first switching computer. To do this, it is possible, for example, to store the IP address of the second switching computer in the address field of a data packet by means of which the X.25 connection is produced between the converter and the first switching computer. This avoids the need to keep and maintain in the switching computer tables for translating the X.25 addresses into IP addresses. In a preferred embodiment, the last four bytes of the address field are used for this purpose.

In addition, the method according to the invention can be expanded such that, if the data transmission does not take place via the computer network, the private branch exchange attempts to carry out the data transmission via another computer network or a tie line.

It is advantageous to expand the method according to the invention such that a calling converter is identified to a called converter. This allows a number of converters to be used in one private network. "Direct Dialing In" numbers, or DDI numbers for short, may be agreed, for example, for this purpose. In a first embodiment, at least one DDI number is assigned to each converter. The calling converter sends this number, in addition to the wanted data and control data, to the called converter. This embodiment may be used when the first switching computer also sends the number of the calling converter to the second switching computer.

In a further embodiment, each combination of calling and called converters is assigned a DDI number. The calling converter translates the number which has been dialed by a subscriber into the DDI number for the called converter. The called converter thus uses the expanded number to identify the calling converter. The identification of the calling converter allows the called converter to set up a connection to the calling converter, in order to transmit control data to the calling converter.

With the above and other objects in view there is also provided, in accordance with the invention, a telecommunications system with a plurality of subscribers, comprising:

a first private branch exchange, a second private branch exchange, and a computer network for transmitting data from the first private branch exchange to the second private branch exchange;

each the private branch exchange having a number plan listing all subscribers of the telecommunications system and a respective the private branch exchange assigned to each subscriber;

a first converter assigned to the first private branch exchange, the first converter:

splitting the data to be transmitted from a calling subscriber of the first private branch exchange to a called subscriber of the second private branch exchange into wanted data with wanted information and connection set-up information according to the number plan and into control data for controlling the second private branch exchange; and determining destination address information identifying a receiver device with the connection set-up information;

a first switching unit assigned to the first private branch exchange for converting the wanted data and the control data into data packets and for transmitting the data packets via the computer network to the receiver device designated by the destination address information;

a second switching unit assigned to the second private branch exchange for converting the data packets received from the first switching unit into wanted data and control data; and a second converter assigned to the second private branch exchange for joining the wanted data and the control data converted by the second switching unit and forming data for further processing by the second private branch exchange.

The computer network used in the system is the Internet or an intranet.

Other features which are considered as characteristic for the invention are set forth in the appended claims.

Although the invention is illustrated and described herein as embodied in Method and telecommunications system for transmitting data from a first to a second private branch exchange, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
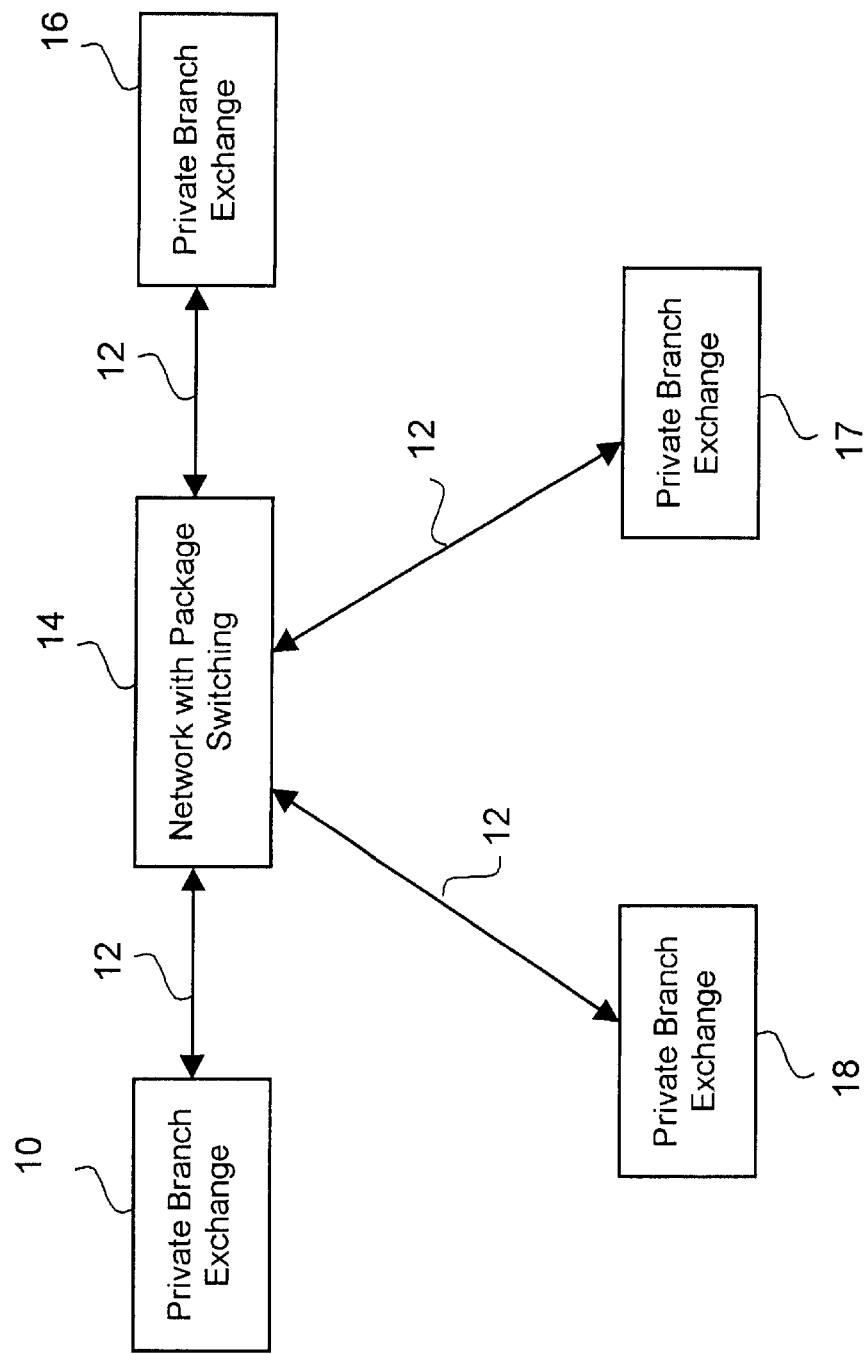
FIG. 1 is a block schematic of a network of private branch exchanges.

Referring now to the figures of the drawing in detail and first, particularly, to FIG. 1 thereof, there is seen, schematically, a network having four private branch exchanges 10, 16, 17, 18 as an exemplary embodiment of the invention.

A number plan is agreed for the network of private branch exchanges 10, 16, 17, 18, and assigns a number to each subscriber connected to the private branch exchanges 10, 16, 17, 18. The number plan is known in all the private branch exchanges 10, 16, 17, 18. The respective private branch exchange 10, 16, 17, 18 uses the number plan to determine the private branch exchange 10, 16, 17, 18 to which the called subscriber whose number has been dialed by a calling subscriber belongs.

Each private branch exchange 10, 16, 17, 18 is connected via a connection 12 to a computer network 14 which is used for data transmission. The known Internet Protocol IP is used for transmitting data in the computer network 14. This Internet Protocol IP is responsible for splitting into data packets the data to be transmitted. These data packets are transmitted via the computer network 14, and are recomposed at the destination point. The Internet Protocol IP also defines addresses for computers between which it is intended to transmit data. Such an address is called the IP address. Other protocols for packet-switching computer networks may also be used. A precondition is that the protocol allows an adequate data transmission rate.

Both wanted data and control data are transmitted via the connection 12 between the computer network 14 and the private branch exchange 10, 16, 17, 18. Apart from digitized voice, the wanted data also include information which is required to set up and clear a telephone connection. The control data comprise data for carrying out service attributes which can be made available only by these private branch exchanges 10, 16, 17, 18.

Figure 2:
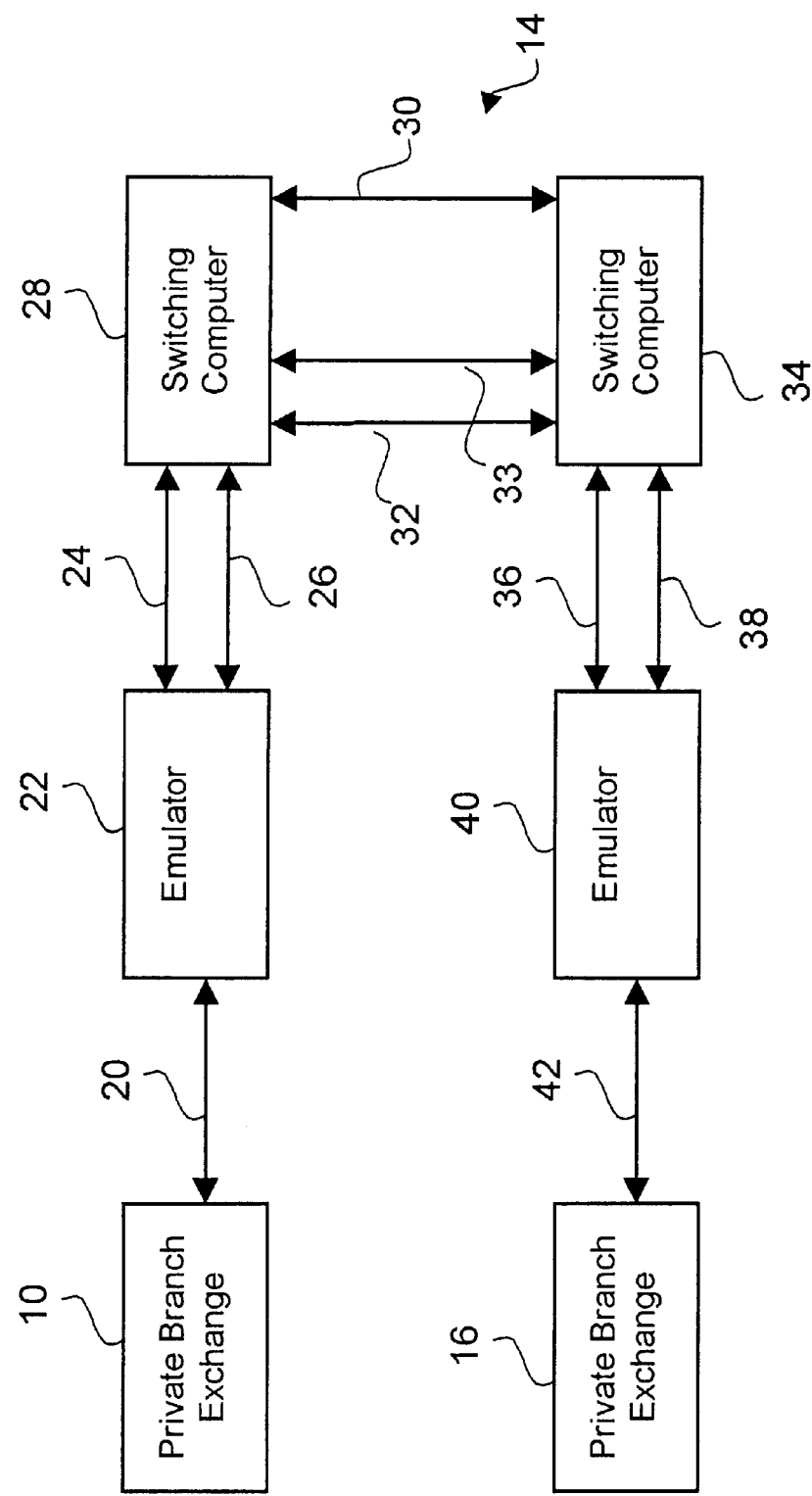
FIG. 2 is a block schematic of a telephone connection between two private branch exchanges.

As an example of the use of the invention, FIG. 2 shows a telephone connection between the two private branch exchanges 10 and 16. Data are sent from a private branch exchange 10, via a connection 20, to an emulator 22. As mentioned, the data are composed of wanted data and control data.

The emulator 22 produces a connection 24 to a switching computer 28, for the transmission of control data. The switching computer 28 offers access to the computer network 14. The conventional X.25 protocol is used for transmitting the control data. The X.25 protocol defines a method for data interchange between two computers, in which method the data are transmitted in the form of data packets. Alternatively, any other protocol for connection-oriented data transmission may be used.

Before the connection 24 is set up, the emulator 22 defines the IP address of a switching computer 34 to which the control data are to be sent. The IP address of the switching computer 34 is contained in an address field of the data packets which the emulator 22 sends to the switching computer 28. That address field also contains the address of the emulator 22 and the address of a further emulator 40. The emulator 40 controls the communication between the switching computer 34 and the private branch exchange 16.

The wanted data are passed on from the emulator 22 to the switching computer 28 via a connection 26. An analog ISDN, Euro-ISDN or T1 connection may be used, for example, for the connection 26. The T1 connection is a permanent line, which is constructed in accordance with the requirements of the known T1 Standard. The emulator 22 adds a local dialing code and a national dialing code to the dialed number, which code numbers identify the emulator 40. The switching computer 28 can use this addition to determine the IP address of the switching computer 34.

The switching computer 28 uses the computer network 14 to produce a connection 30 to the switching computer 34, via which the control data are transmitted. One or more connections 32 are set up between the two switching computers 28 and 34, in order to transmit the wanted data. The number of connections 32 depends on the amount of wanted data to be transmitted per unit time.

The switching computer 34 passes on the received control data via a connection 36 to the emulator 40. The wanted data which have been received via the connections 32 are recomposed by the switching computer 34, and are sent by a connection 38 to the emulator 40. The X.25 protocol is used once again for the transmission via the connection 36. The connection 38 may be, for example, an analog ISDN, Euro-ISDN or T1 connection. Only basic control information is used for the transmission of the wanted data via the connections 26 and 38.

The emulator 40 composes the control data and the wanted data once again in the same way that they were sent from the private branch exchange 10 to the emulator 22. The emulator 22 sends the composed data via a connection 42 to the private branch exchange 16, to which the called subscriber belongs and whose number was dialed by the calling subscriber in the private branch exchange 10.

Figure 3:
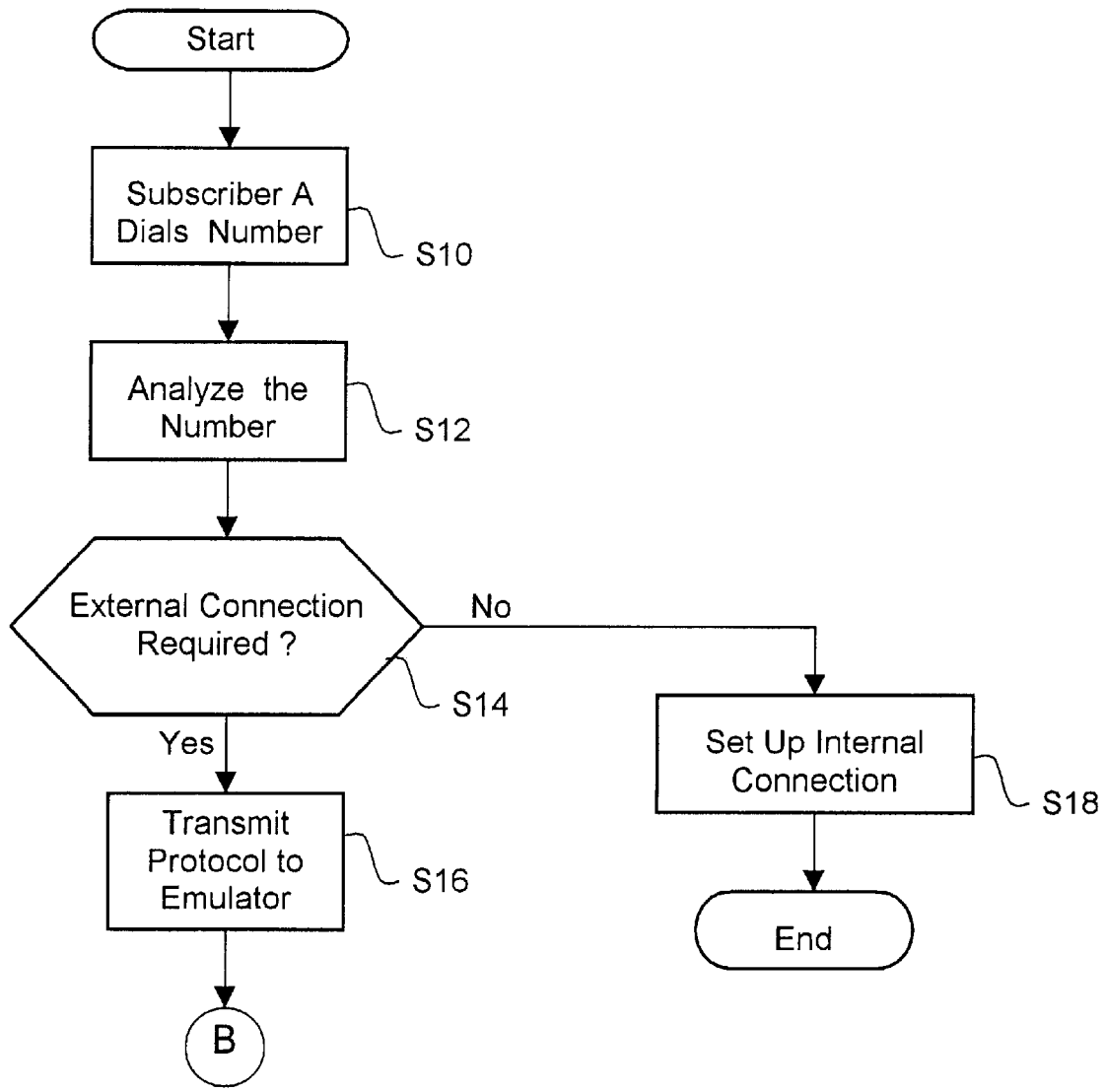
FIG. 3 is a flow chart of a sequence of method steps prior to the start of setting up the telephone connection.

FIGS. 3 to 6 show sections of a flowchart for setting up the connection for a telephone connection between a calling subscriber A in the private branch exchange 10 and a called subscriber B in the private branch exchange 16. FIG. 3 shows the method steps prior to the start of setting up the connection. In the method step S10, the subscriber A dials, from a terminal which belongs to the private branch exchange 10, the number assigned to a terminal of the subscriber B. This terminal belongs to the private branch exchange 16.

In the step S12, the dialed number is analyzed with the aid of the number plan, that is to say the private branch exchange 10 determines the private branch exchange to which the dialed number belongs. The answer to the question S14 is negative if the dialed number belongs to a terminal within the private branch exchange 10, and a jump is made to the Section I. A connection to a terminal of the private branch exchange 10 is then set up in step S18. This uses a protocol which defines how a connection can be set up and how a connection can be cleared. This protocol also determines which service attributes the private branch exchanges 10 and 16 have. One example of such a service attribute is the already mentioned call diversion, that is to say a subscriber may instruct the private branch exchange to divert to another terminal all calls going to a specific terminal.

If the answer to the question S14 is positive, the private branch exchange 10 transmits via the connection 20 to the emulator 22 a protocol call, which instructs the emulator 22 to set up a connection to the private branch exchange 16 (step S16). The protocol call starts a program which carries out a function dictated by the protocol. One example of such a protocol is the already mentioned QSIG protocol. Other known protocols are CorNet-N or DPNSS.

Figure 4:
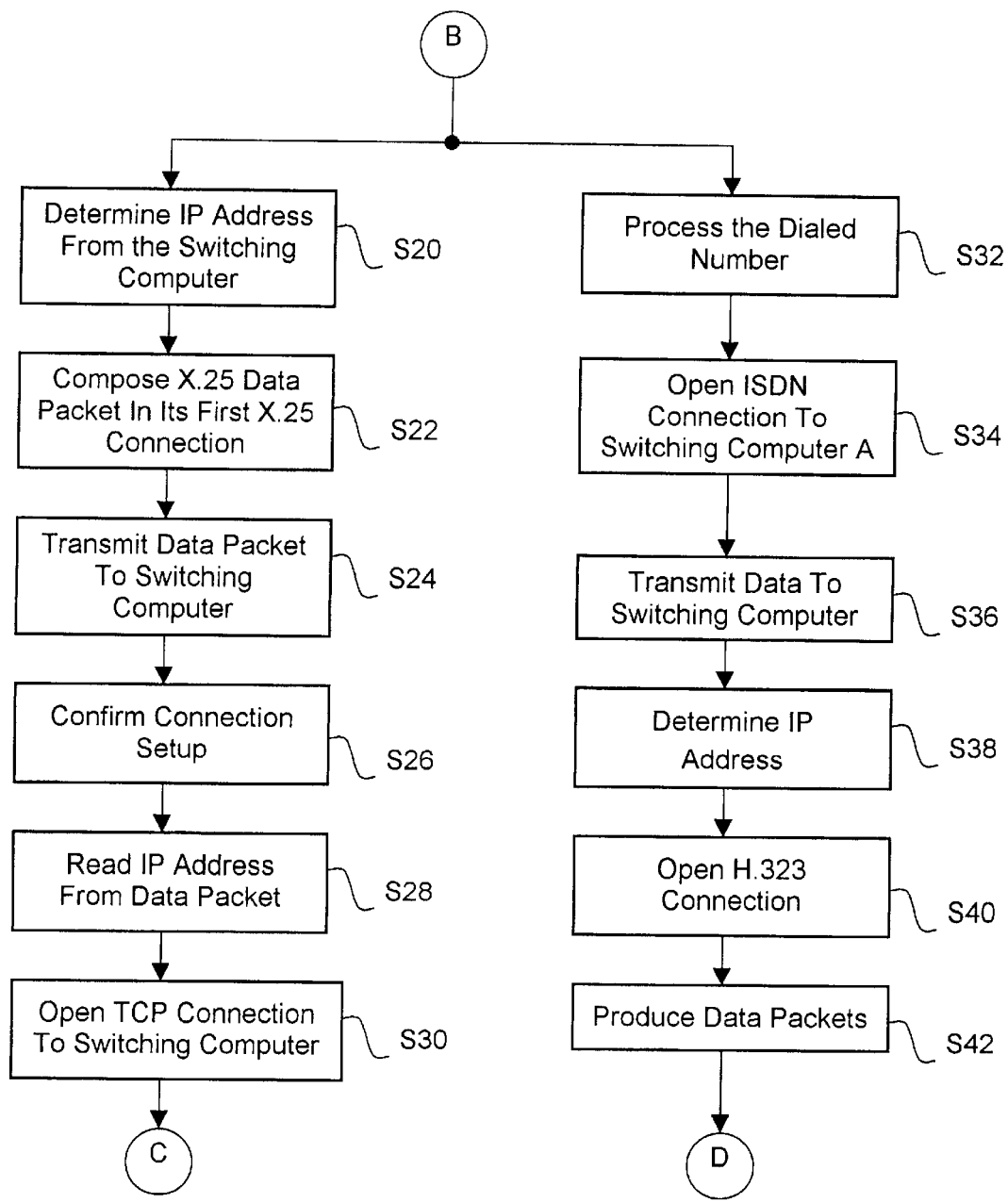
FIG. 4 is a continuation of the flow chart of the process of setting up the telephone connection, prior to opening up the connections between the switching computers.

FIG. 4 shows the sequence of steps by means of which the connection between the emulator 22 and the switching computer 28, and the connections between the switching computers 28 and 34, are set up. The setting up of the connections for transporting the control data (steps S20 to S30) and the setting up of the connections for transporting the wanted data (steps S32 to S42) are in this case carried out roughly at the same time.

In step S20, the emulator 22 uses the private branch exchange 16 to which the connection is intended to be set up in this example to define the address of the emulator 40 and the address of the switching computer 34. These addresses are required in order to allow the control data to be passed through the computer network 14 and from the switching computer 34 to the emulator 40. The address of the switching computer 34 is its IP address. Using this information, the emulator 32 composes, in step S22, a data packet by means of which the connection 24 is set up to the switching computer 28. The connection 24 is an X.25 connection.

In the method step S24, the data packet is sent to the switching computer 28. The switching computer 28 must confirm that the connection 24 has been set up (step S26). In step S28, the switching computer 28 reads the IP address of the switching computer 34, so that the connection 30 in the computer network 14 can be established in the step S30. The known Transmission Control Protocol TCP is used for data interchange via the connection 30.

The steps S32 to S42 described in the following text take place roughly at the same time as the steps S20 to S30 that have just been described. In the sequence step S32, the dialed number is processed such that the switching computer 28 can use the processed number to determine the IP address of the switching computer 34. As has already been mentioned further above, this process number comprises the dialed number, with a national dialing code and a local dialing code added to it.

In the sequence step S34, the emulator 22 opens the connection 26 to the switching computer 28. The connection 26 is an ISDN connection. In the step S36, the wanted data already present are transmitted to the switching computer 28. The wanted data also include the processed number, from which the IP address of the switching computer 34 is determined in the step S38. The switching computer 28 can now open the connections 32 to the switching computer 34 (step S40). The wanted data are transmitted through the computer network 14 via these connections 32. The number of connections 32 depends on the amount of wanted data which must be transmitted. The data transmission may use any protocol which is suitable for the transmission of voice data via a packet-switching computer network, for example the known H.323 protocol or the so-called Real Time Protocol (RTP). The data packets are produced in accordance with the Internet Protocol IP in the step S42.

Figure 5:
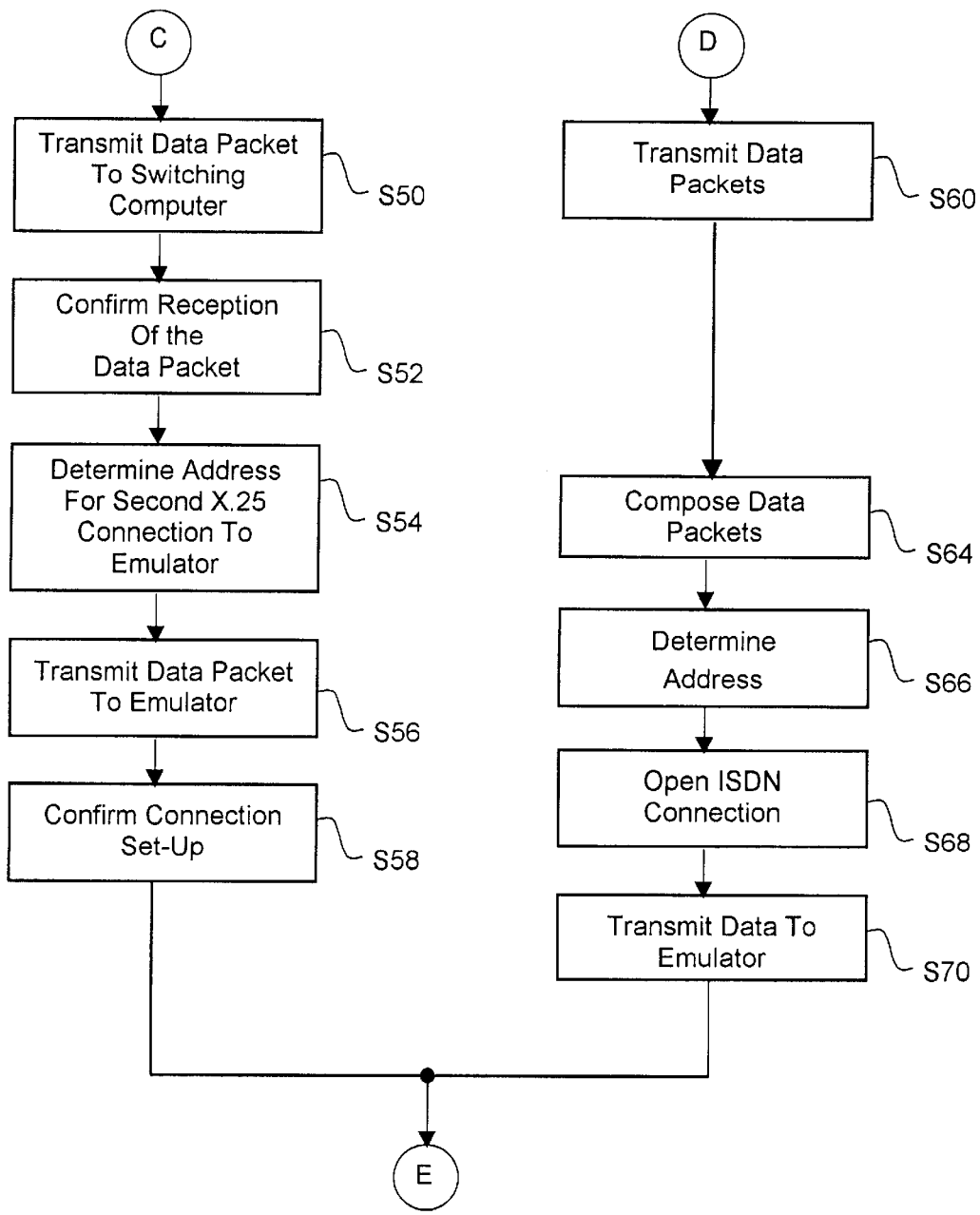
FIG. 5 is a continuation of the flow chart of the process of setting up the telephone connection, prior to transmitting the data to an emulator.

Referring now to FIG. 5, there is shown the method sequence prior to setting up the connections to the emulator 40. Steps S50 to S58 relate to the transmission of the control data. Steps S60 to S70 relate to the transmission of the useful data.

In the sequence step S50, the switching computer 28 transmits the data packets with the control data to the switching computer 34, which confirms correct reception of the data packets to the switching computer 28 (step S52). This confirmation is dictated by the Transmission Control Protocol TCP. In the method step S54, the switching computer 34 recomposes the data packets, and determines the address of the emulator 40. It then opens a connection 36 to the emulator 40 and transmits the control data to the emulator 40 (step S56). The X.25 protocol is used to transmit the control data via the connection 36. In the step S58, the emulator 40 confirms to the switching computer 34 that the connection 36 has been set up.

In parallel with these steps S50 to S58, the switching computer 28 sends, in the step S60, the data packets with the wanted data via the computer network 14 to the switching computer 34.

The switching computer 34 recomposes the received data packets with the wanted data (step S64), and uses the transmitted data to determine the address of the emulator 40 (step S66). This address is used to set up the connection 38 to the emulator 40 (step S68). The connection is an ISDN connection through the public telephone network. The switching computer 34 can send the wanted data to the emulator 40 in the method step S70.

Figure 6:
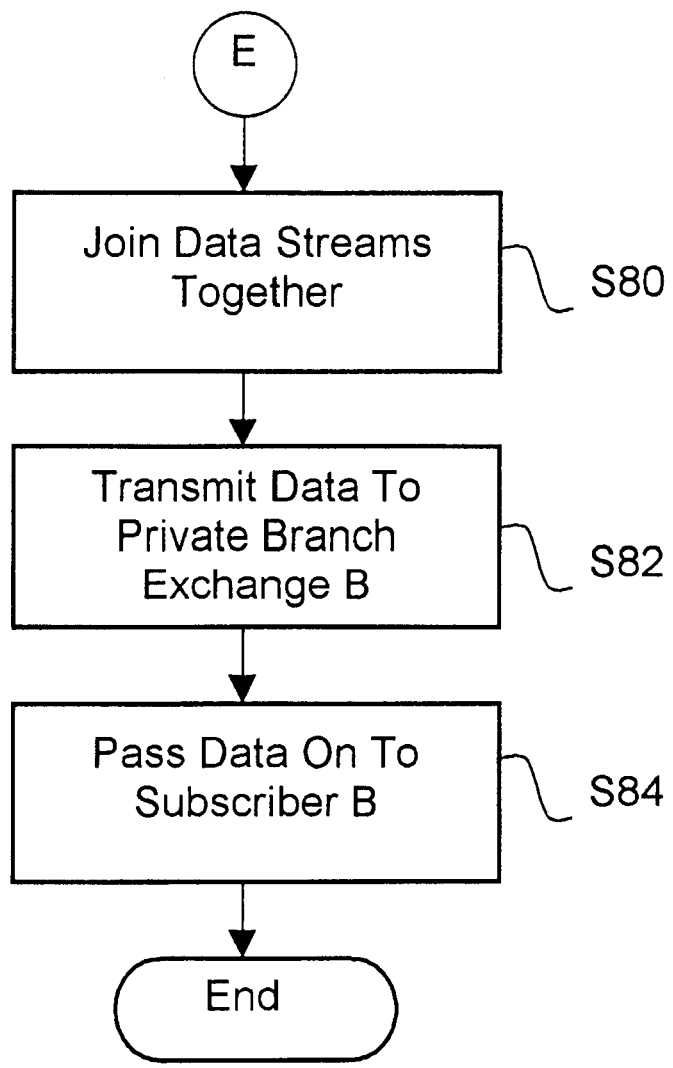
FIG. 6 is a continuation of the flow chart of FIG. 5, to the end of the process of setting up the telephone connection.

FIG. 6 shows the final steps of setting up the connections. The emulator 40 joins the control data and the wanted data together in the method step S80, and passes those data on via the connection 42 to the private branch exchange 16 (step 82). In the step S84, the private branch exchange 16 transmits the data to the terminal whose number has been dialed by the subscriber A.

I claim:

1. A method for transmitting data from a first private branch exchange via a computer network to a second private branch exchange, where a number plan is assigned to the first private branch exchange, and the number plan contains subscribers of the private branch exchanges and a respective private branch exchange associated with each subscriber, the method which comprises the following method steps:

splitting data to be transmitted from a calling subscriber of a first private branch exchange to a called subscriber of the second private branch exchange into wanted data and control data with a first converter assigned to the first private branch exchange, wherein the wanted data contain wanted information and connection set-up information, and the control data are data for controlling the second private branch exchange;

formulating, with the first converter, connection set-up information by using the number plan and determining destination address information and identifying a receiver device;

converting, with a first switching unit assigned to the first private branch exchange, the wanted data and control data into data packets, and transmitting the data packets via a computer network to the receiver device designated by the destination address information;

receiving the data packets with a second switching unit assigned to the second private branch exchange, converting the data packets into wanted data and control data, and passing the data on to a second converter; and joining the wanted data and the control data together with the second converter and forming data for further processing by the second private branch exchange.

2. The method according to claim 1, wherein the computer network is one of an Internet and an intranet.

3. The method according to claim 1, wherein the converting step comprises producing the data packets according to the Internet Protocol.

4. The method according to claim 1, which comprises transmitting the wanted data and the control data via separate channels in the computer network.

5. The method according to claim 1, which comprises transmitting the wanted data via at least two channels in the computer network.

6. The method according to claim 1, which comprises transmitting, with the first converter, the control data via a first connection and the wanted data via a second connection separate from the first connection, to the first switching unit.

7. The method according to claim 1, which comprises splitting the control data into data packets with the first converter and supplying the data packets to the first switching unit with the first converter.

8. The method according to claim 1, which comprises producing the data packets with the X.25 protocol.

9. The method according to claim 1, which comprises transmitting the wanted data with a method selected from the group consisting of ISDN, Euro-ISDN, T1-protocol, and a protocol for analog voice transmission.

10. The method according to claim 1, wherein the control data describe service attributes in accordance with a protocol selected from the group consisting of CorNet-N protocol, DPNSS protocol, and QSIG protocol.

11. The method according to claim 1, which comprises forming data blocks in accordance with the HDLC protocol from the data packets, and identifying the data blocks by symbols.

12. The method according to claim 1, which comprises identifying the second converter with the first converter by a DDI number.

13. The method according to claim 1, wherein each converter has a number plan and the number plan for each converter includes a unique DDI number, and the method further comprises sending the DDI number assigned to the first converter to the second converter.

14. The method according to claim 1, wherein each combination of calling converters has a number plan and the number plan for each combination of calling converters and called converters includes a DDI number, and the method further comprises sending the DDI number from the first converter to the second converter.

15. A telecommunications system with a plurality of subscribers, comprising:

a first private branch exchange, a second private branch exchange, and a computer network for transmitting data from said first private branch exchange to said second private branch exchange;

said first private branch exchange having a number plan listing all subscribers of the telecommunications system and a respective said private branch exchange assigned to each subscriber;

a first converter assigned to said first private branch exchange, said first converter:
splitting the data to be transmitted from a calling subscriber of said first private branch exchange to a called subscriber of said second private branch exchange into wanted data with wanted information and connection set-up information according to the number plan and into control data for controlling said second private branch exchange; and
formulating connection setup information by using the number plan and determining destination address information identifying a receiver device with the connection set-up information;

a first switching unit assigned to said first private branch exchange for converting the wanted data and the control data into data packets and for transmitting the data packets via said computer network to the receiver device designated by the destination address information;

a second switching unit assigned to said second private branch exchange for converting the data packets received from said first switching unit into wanted data and control data; and a second converter assigned to said second private branch exchange for joining the wanted data and the control data converted by said second switching unit and forming data for further processing by said second private branch exchange.

16. The telecommunications system according to claim 15, wherein said computer network is the Internet.

17. The telecommunications system according to claim 15, wherein said computer network is an intranet.

18. The telecommunications system according to claim 15, wherein the data packets are produced according to the Internet Protocol.

19. The telecommunications system according to claim 15, wherein the wanted data and control data are transmitted via separate channels in the computer network.

* * * * *